United States Patent
Rieger et al.

(10) Patent No.: US 12,472,782 B2
(45) Date of Patent: Nov. 18, 2025

(54) ANTI-SKID CHAIN HAVING A ROTATION-BLOCKING ELEMENT BETWEEN ADJACENT CHAIN LINKS

(71) Applicant: RUD KETTEN RIEGER & DIETZ GMBH U. CO. KG, Aalen (DE)

(72) Inventors: Johannes Werner Rieger, Oberkochen (DE); Bernd Rosler, Aalen-Wasseralfingen (DE)

(73) Assignee: Rud Ketten Rieger & Dietz GmbH u. Co. KG (DE)

( * ) Notice: Subject to any disclaimer, the term of this patent is extended or adjusted under 35 U.S.C. 154(b) by 959 days.

(21) Appl. No.: 17/596,579

(22) PCT Filed: Jun. 19, 2020

(86) PCT No.: PCT/EP2020/067111
§ 371 (c)(1),
(2) Date: Dec. 14, 2021

(87) PCT Pub. No.: WO2021/001172
PCT Pub. Date: Jan. 7, 2021

(65) Prior Publication Data
US 2022/0297485 A1 Sep. 22, 2022

(30) Foreign Application Priority Data
Jul. 1, 2019 (DE) .................. 10 2019 209 620.4

(51) Int. Cl.
*B60C 27/02* (2006.01)
*B60C 27/06* (2006.01)
*B62D 55/04* (2006.01)
*B62D 55/205* (2006.01)

(52) U.S. Cl.
CPC ........ *B60C 27/0215* (2013.01); *B60C 27/023* (2013.01); *B60C 27/062* (2013.01);
(Continued)

(58) Field of Classification Search
CPC ...... B62D 55/04; B62D 55/20; B62D 55/205; B60C 27/0207; B60C 27/0215;
(Continued)

(56) References Cited

U.S. PATENT DOCUMENTS

| 1,542,715 | A | * | 6/1925 | Owens | .................. B62D 55/26 305/152 |
| 1,868,148 | A | * | 7/1932 | Mcmillan | .............. B62D 55/20 305/155 |
| 3,945,418 | A | * | 3/1976 | Muller | ................... B60C 27/08 152/243 |

FOREIGN PATENT DOCUMENTS

| DE | 703043 | | 1/1941 |
| DE | 2254173 | A1 | 5/1975 |

(Continued)

OTHER PUBLICATIONS

International Search Report issued in PCT application No. PCT/EP2020/067111, dated Sep. 22, 2020.
(Continued)

*Primary Examiner* — Kip T Kotter
(74) *Attorney, Agent, or Firm* — Barnes & Thornburg LLP; Jeffrey R. Stone

(57) ABSTRACT

The invention relates to an anti-skid chain for tires, in particular for bogie axles, wherein the anti-skid chain has two laterally stable guide chains which, when installed, are arranged to the side of the treads of the tires, wherein the anti-skid chain has a flexible chain mesh which extends between the two guide chains, and wherein at least one guide chain has chain links which are interconnected in an articulated manner by means of joint pins in the circumferential direction, and at least one rotation-blocking element by means of which a maximum joint angle between two interconnected chain links is defined. In order to prevent lateral pulling of the anti-skid chain and, at the same time, to
(Continued)

provide an anti-skid chain that is easy to produce, according to the invention, a part of the rotation-blocking element is located on at least one of the joint pins

10 Claims, 2 Drawing Sheets

(52) U.S. Cl.
CPC ............ B60C 27/067 (2013.01); B62D 55/04 (2013.01); B62D 55/205 (2013.01)

(58) Field of Classification Search
CPC ... B60C 27/023; B60C 27/061; B60C 27/062; B60C 27/067; B60C 27/08
See application file for complete search history.

(56) References Cited

FOREIGN PATENT DOCUMENTS

| DE | 102018208325 | 11/2019 |
|----|--------------|---------|
| WO | 2013135427 | 9/2013 |
| WO | 2018104770 | 6/2018 |

OTHER PUBLICATIONS

Office Action issued by the Canadian Patent Office in application No. 3,143,082 and dated Feb. 3, 2023.

\* cited by examiner

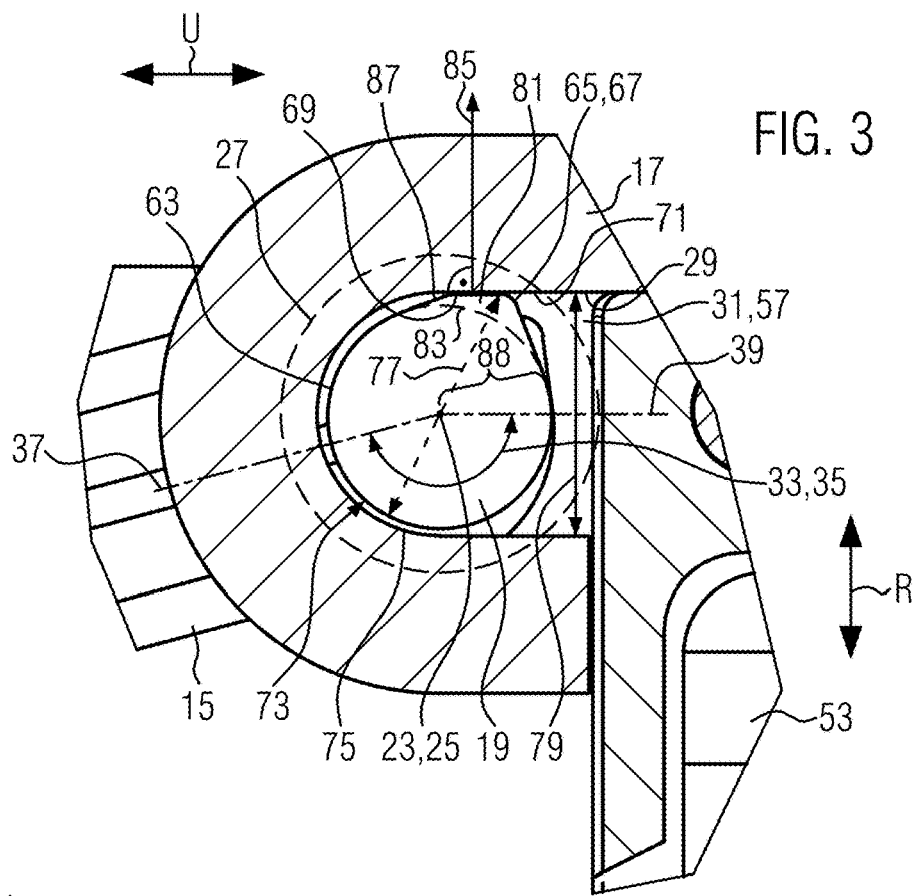
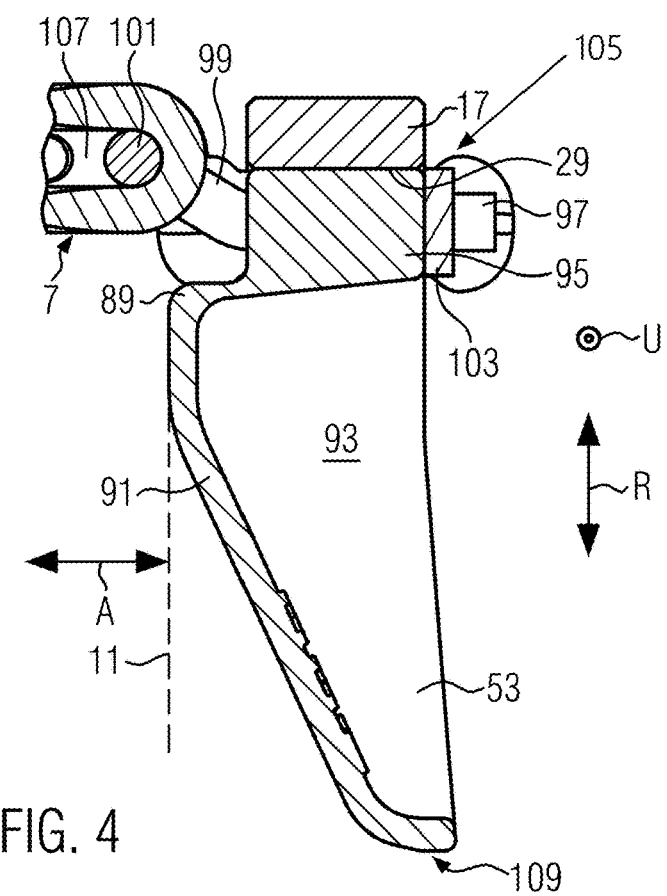

ANTI-SKID CHAIN HAVING A ROTATION-BLOCKING ELEMENT BETWEEN ADJACENT CHAIN LINKS

The invention relates to an anti-skid chain for tires, in particular for bogie axles, wherein the anti-skid chain has two laterally stable guide chains which, when installed, are arranged to the side of the treads of the tires, wherein the anti-skid chain has a flexible chain mesh which extends between the two guide chains, and wherein at least one guide chain has chain links which are interconnected in an articulated manner by means of joint pins in the circumferential direction, and at least one rotation-blocking element by means of which a maximum joint angle between two interconnected chain links is defined.

Anti-skid chains, in particular for bogie axles, that means for tandem bogies, are known, for example, from WO 2013/135427. The anti-skid chain described therein is laterally stable due to its guide chains. It is moreover provided with a rotation-blocking element defining a self-supporting radius of the guide chains. However, this anti-skid chain is complicated to produce.

It is thus an object of the invention to provide a laterally stable anti-skid chain of the type mentioned above which is easy to produce.

This object is achieved for the anti-skid chain according to the invention in that the rotation-blocking element is arranged in parts at at least one of the joint pins. By the arrangement of the rotation-blocking element at a joint pin of a chain link, an easy and inexpensive manufacture is possible since the joint pins of chain links can be easily manufactured. The joint pin can moreover be utilized as a joint which defines the movability of the chain links of the guide chain with respect to each other and thereby ensures the lateral stability. The joint pin is moreover well-screened from outside by the chain link through which it extends, so that damages of the rotation-blocking element are less probable.

By the rotation-blocking element according to the invention, it can be ensured that the maximum joint angle is maintained. By maintaining the maximum joint angle, lateral pulling of the anti-skid chain can in turn be prevented. Such lateral pulling can in particular occur if the two guide chains of an anti-skid chain move along a circumferential direction of the anti-skid chain at different speeds.

The joint angle between two interconnected chain links is the angle the two chain links together include. With a linearly extended chain, the joint angle would consequently be 180°. Preferably, the joint angle is adjusted such that the guide chain may only bend around the tire axis to such an extent that its radius is approximately equal to the radius of a tire tread in an unloaded state of the tire, The radius the guide chain occupies by the rotation-blocking elements when the maximum joint angle is reached is referred to as the self-supporting radius. The self-supporting radius may possibly be somewhat smaller or somewhat larger than the radius of the tire in an unloaded state.

The solution according to the invention can be further improved by various embodiments which are each advantageous per se and can be combined with each other as desired. These embodiments and the advantages in connection therewith will be discussed below.

According to a first advantageous embodiment, the at least one joint pin has an axial orientation. Axial here relates to the tire axis. The axial direction extends perpendicularly to a circumferential direction along which the closed anti-skid chain extends. In other words, the articulated connection can move around a joint axis which is essentially oriented perpendicularly to the circumferential direction of the anti-skid chain. The chain links can pivot around the joint axes relative with respect to each other in the radial direction until they are stopped by the rotation-blocking element.

The joint axis of the joint pins, however, is not necessarily oriented exactly in parallel to the tire axis. A deviation of the joint axes from the tire axes can occur, for example, by the joint axes not extending exactly in parallel to the tire axes when the guide chains abut against the tire shoulders, but may have a tilt in the radial direction.

By the axial orientation of the joint axis, however, a deflection of the chain links connected to each other is reduced or prevented in the axial direction. This ensures the lateral stability of the guide chains, The chain links of the guide chains can only move within planes oriented transversely to the tire axis.

The at least one rotation-blocking element can include at least one stop face at the joint pin which stops against the inner side of an opening of the chain link holding the joint pin at the maximum joint angle. In other words, the maximum joint angle is reached when the at least one joint pin has stopped with the stop face against the inner side, in particular against a radially external inner side, of the opening of a chain link holding the joint pin. By this, a further rotation or deflection of the chain links with respect to each other is effectively prevented.

According to a further advantageous embodiment, the at least one guide chain can be composed of alternately standing and lying chain links which are each at least approximately annular, wherein in the standing chain links, central openings are oriented axially and in the lying chain links are oriented radially or go through, and wherein the lying chain links include the joint pins.

The standing chain links can each span a plane extending essentially perpendicularly to the axial direction. The lying chain links can each span a plane extending essentially perpendicularly to the radial direction, The standing chain links can abut against the tread of the tires when installed. In the openings of the standing chain links, the joint pins of the lying chain links can be inserted and rotatably mounted therein, In order to facilitate the insertion process, the standing chain links can have the shape of an open ring or, in other words, be &shaped. After the insertion of the lying chain links with the joint pin, the openings in the standing chain links can be closed. The standing chain links are preferably made of strip stock.

The standing chain links can moreover include guide webs for guiding the guide chains at the tires. The guide webs preferably extend, when installed, at least over a portion radially to the inside along the tire wall. Preferably, chain links of the chain mesh are fixed to the standing chain links.

The joint pins are preferably monolithically formed with the chain links including the joint pins, for example by forging. Preferably, one chain link each includes two joint pins, wherein the joint pins are arranged at the opposed ends of a chain link and interconnect the legs of the chain link. The joint pins quasi replace the curves of the chain link. Preferably, the chain links including the joint pins are made of a round material, in particular of round steel, Of course, the joint pins can also be pins which are, just as in known joint chains, inserted in openings of the legs and captively connected with them.

To obtain a stop face at the joint pin that is preferably easy to manufacture and at the same time effective, the at least one joint pin preferably has a non-circular cross-section for forming the at least one stop face. In particular one point of the cross-section deviating from a circularity can be utilised as the stop face for abutting against an inner side of the opening of one of the standing chain links.

In a particularly preferred manner, the at least one joint pin is provided, in particular in its cross-section, with at least one shoulder including the at least one stop face. Along its longitudinal extension, the shoulder can form a bead or a rib.

For easily manufacturing a stop face, the at least one joint pin can be provided with at least one joined additional element including the at least one stop face. The joined additional element can be connected with the rest of the joint pin, for example by a material bond. Such a connection can be achieved in particular by forging the joined additional element to the rest of the joint pin.

As an alternative, an additional element can also be welded to it or fixed in another way. It can also be possible to form a joint pin without any additional element such that it forms a stop face, in particular a stop face arranged in a region in which the joint pin deviates from a circular cross-section. For example, such a stop face can be formed by forging or by metal-cutting methods.

The at least one stop face is preferably oriented such that it abuts in parallel to the inner side of the standing chain link at the maximum joint angle. The parallelism here relates to the region of the inner side against which the stop face itself abuts.

To achieve that the at least one joint pin can rotate in the chain link in which the joint pin is received until the maximum joint angle is reached, the at least one stop face is preferably arranged to face away from the rest of the chain link that includes the stop face. In other words, a surface normal of the stop face preferably faces away from the rest of the chain link that includes the stop face, In particular, the surface normal can at least partially face towards the chain link that comes next in the circumferential direction. In a cross-section of the joint pin, the at least one stop face is preferably arranged essentially within a cross-sectional half opposed to the rest of the chain link.

Preferably, each one of the two joint pins of one chain link is provided with a stop face. Also preferably, each standing chain link is connected with two lying chain links, wherein each one of the two lying chain links includes two joint pins with stop faces. Of the two joint pins of the two lying chain links received in the standing chain link, the two stop faces are preferably opposed with respect to the opening of the standing chain link. In other words, the surface normal of the two stop faces intersect.

The at least one stop face is preferably arranged at a radially external side or an outer side of a joint pin. Thereby, the stop face abuts against the radially internal side of an opening of the standing chain link at a maximum joint angle.

When the maximum joint angle is reached, the at least one stop face preferably flatly abuts, at least in sections, against the inner side of the opening of the, in particular standing, chain link that holds the joint pin. Preferably, the stop face is here at least in sections flat to obtain a preferably large contact surface.

To improve the lateral guidance of the anti-skid chain at the tire, at least one standing chain link can be provided with at least one guide web extending radially in the direction of the tire axis for laterally guiding the anti-skid chain.

To obtain a standing chain link with at least one guide web which is easy to manufacture, the at least one standing chain link can include a C-shaped partial link with an interruption in a leg, the interruption being at least partially closed by the at least one guide web. The at least one guide web is here preferably arranged centrically in the chain link. The joint pins are preferably held at the opposed ends which include the curves of the standing chain link. By the guide web, the joint pins cannot reach the interruption in the leg and are therefore captively connected to the standing chain link.

To obtain a particularly good lateral guidance, a radial length of the standing chain link, in particular inclusive of the guide web, is larger than a length of the standing chain link in the circumferential direction.

The flexible chain mesh is preferably composed of chain links and traction webs.

The invention will be illustrated more in detail below by way of example by an advantageous embodiment with reference to the drawings. The combination of features represented in the embodiment by way of example can be supplemented by further features according to the above illustrations corresponding to the properties of the anti-skid chain according to the invention for a certain case of application. Moreover, also according to the above illustrations, individual features can be omitted in the described embodiment if the effect of this feature is not relevant in a concrete case of application. In the drawings, the same reference numerals are always used for elements of the same function and/or the same structure.

In the drawing:

FIG. 3 shows an enlarged representation of a cross-section of a joint pin marked FIG. 2; and FIG. 4 shows a cross-section transverse to the circumferential direction through a standing chain link with the guide web.

Figure 1:
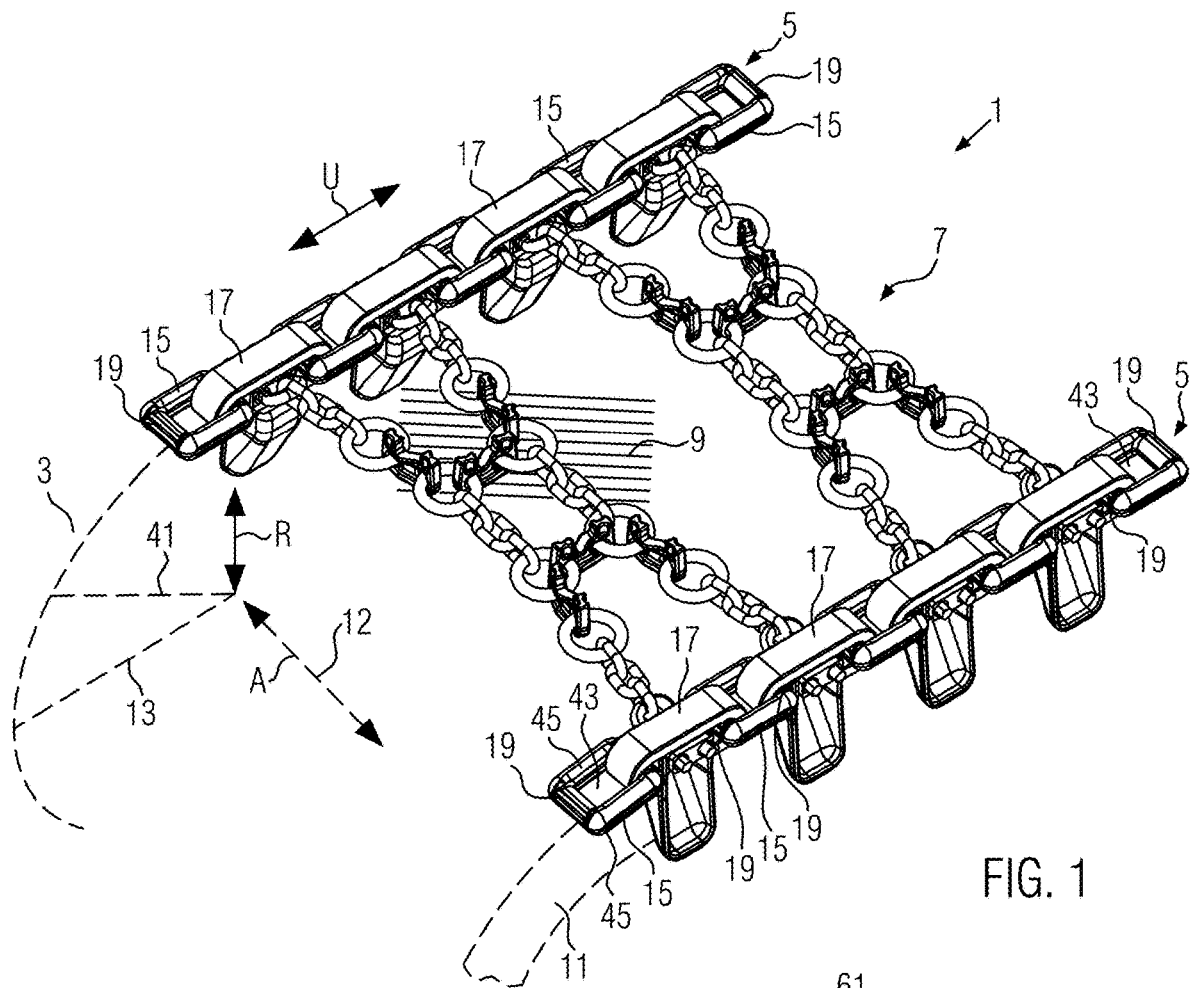
FIG. 1 shows a perspective representation of a partial section of an anti-skid chain according to the invention.

Below, the general structure of the anti-skid chain 1 according to the invention will be described with reference to FIGS. 1 and 2, The anti-skid chain 1 is provided for tires 3 which are only indicated in a dashed line in FIG. 1. In particular, the anti-skid chain 1 can be used for tandem bogies or bogie axles.

The anti-skid chain 1 has two laterally stable guide chains 5 and one flexible chain mesh 7 extending between the guide chains 5. In a state installed at the tire 3, the guide chains 5 are arranged to the side of the treads 9 of the tires 3 at least in sections. In other words, parts of the guide chains 5 can abut against the tire wall 11 to ensure a lateral guidance of the anti-skid chain 1.

Figure 2:
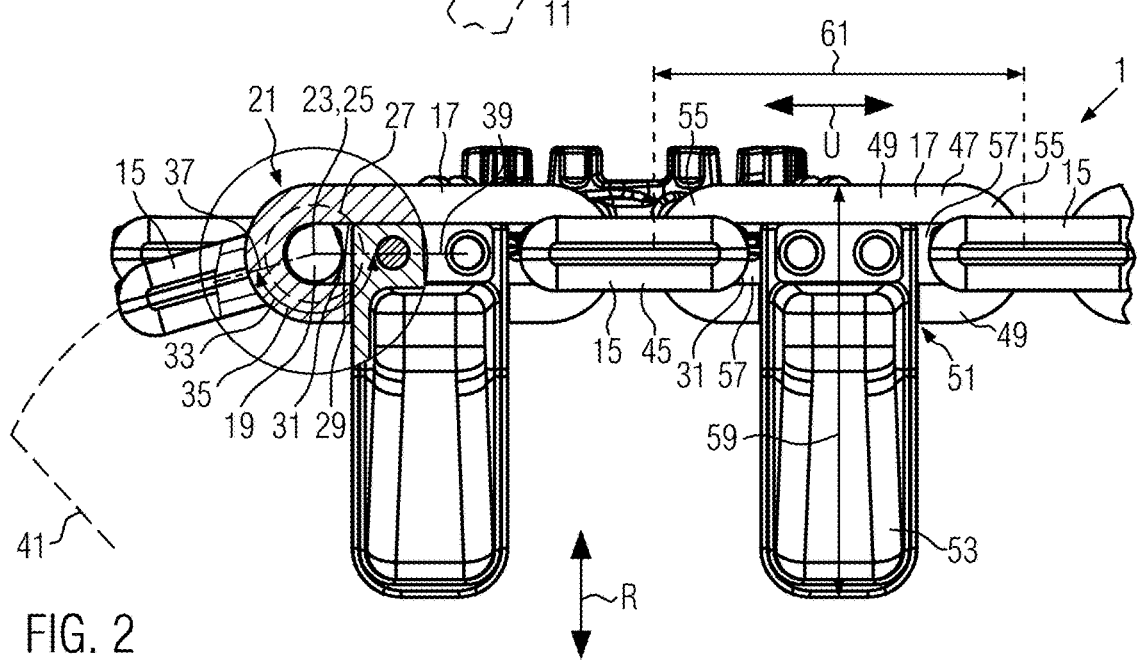
FIG. 2 shows a side view of the anti-skid chain with a view to a guide chain.

The tread 9 and the tire wall 11 are only outlined in Figs. 1. The FIGS. 1 and 2 do not show that the anti-skid chain 1 preferably extends around two tires 3 each along its circumferential direction U.

The tires 3 have an axis 12 extending transversely to the circumferential direction U and defining an axial direction A. The tires 3 moreover have a radius 13 extending from the axis 12 to the tread 9. Both are only outlined in FIG. 1. When installed, the flexible chain mesh 7 abuts against the tread 9 of at least one tire 3 at least in sections.

The guide chains each include chain links 15 and 17, the chain links 15 and 17 being interconnected in an articulated manner. To this end, the chain links 15 each include two joint pins 19 rotatably arranged in the chain links 17.

So, the connection between two interconnected chain links 15 and 17 each forms a swivel joint 21. Here, the chain links 15 and 17 are rotatable with respect to each other about a joint axis 23 coinciding with a longitudinal axis 25 of the joint pin 19, The joint axis 23 is here oriented approximately in parallel to the axial direction A. Deviations of the joint axis 23 from the axial direction A can result from a guide chain 5 lying, when installed at the tire 3, on a not flat tread 9 or having slipped in the direction of the tire wall 11.

The guide chains 5 moreover include rotation-blocking elements 27, The rotation-blocking elements 27 are formed by the interaction of a joint pin 19 and the inner side 29 of the opening 31 of the chain link 17 in which the joint pin 19 is received.

By a rotation-blocking element 27, the rotation of two interconnected chain links 15 and 17 towards the tire axis 12 is limited. In a movement about the joint axis 23, the chain links 15 and 17 include a joint angle 33 between them. The joint angle 33 can be determined between the longitudinal axes 37 and 39 of the chain links 15 and 17. By the rotation-blocking element 27, a maximum joint angle 35 is defined beyond which a further rotation of the chain links 15 and 17 with respect to each other about the joint axis 23 is not possible.

The rotation-blocking element 27 is at least partially arranged at the joint pin 19. This will be discussed later with reference to FIG. 3.

By the rotation-blocking elements 27 and the corresponding maximum joint angle 35, a self-supporting radius 41 for the guide chains 5 is defined. The guide chains 5 can consequently not occupy a smaller radius than the self-supporting radius 41 when being put on. Preferably, the self-supporting radius 41 is approximately within the range of the tire radius 13.

The chain links 15 including the joint pins 19 are preferably lying chain links, while the chain links 17 are preferably standing chain links, Here, the openings 31 of the standing chain links 17 are oriented axially. In other words, the openings 31 so through in parallel to the axial direction A. The openings 43 of the lying chain links 15 including the joint pins 19 are, however, oriented radially. In other words, the openings 43 extend going through along the radial direction R.

The lying chain links 15 are preferably each integrally formed. In other words, the joint pins 19 are preferably monolithically formed with the legs 45.

The standing chain links 17 are preferably formed of C-shaped partial links 47 including an interruption 51 in one leg 49 each. The interruption 51 is preferably arranged at the radially inner leg 49.

By the interruption 51, the opening 31 can be uncovered at least during the assembly of the guide chain 5, so that the joint pins 19 of the chain links 15 can be easily inserted into the opening 31. The interruption 51 is closed by the guide webs 53 when the guide chain 5 is readily installed. The guide webs 53 serve to laterally guide the guide chain 5 and abut against the tire wall 11 when installed.

Preferably, one guide web 53 extends to the radially external leg 49 of the chain link 17. By the guide web 53 arranged centrically in the chain link 17 along the longitudinal axis 39, two partial openings 57 in which the joint pins 19 are formed are received in the curves of the chain link 17. The joint pins 19 are here captively held in the partial openings 57.

The partial openings 57 are preferably dimensioned such that the chain links 15 or their joint pins 19 can be rotated about the joint axes 23, at least until the maximum joint angle 35 is reached. A movement in the other direction, in particular along the axial direction A, however, is only possible in a restricted manner. Thereby, the lateral stability of the guide chain is ensured.

The guide webs 53 are preferably welded to the C-shaped partial link. The guide webs 53 are preferably connected to the chain mesh 7. Preferably, a radial length 59 or, in other words, the height 59 is at least as large as the length 61 of the standing chain link in the circumferential direction. Here, the radial length 59 relates to the complete chain link 17, that means including the guide web 53.

Below, the rotation-blocking element according to the invention will be further described with reference to FIG. 3. The joint pin 19 has an essentially circular cross-section 63. The continuous circularity is represented with a dashed line in FIG. 3. At least at one point 65, the cross-section 63 deviates from the circularity. This point 65 represents a stop 65. The stop 65 represents a shoulder 67 in the cross-section 63.

The stop 65 includes a stop face 69. When the maximum joint angle 35 is reached, the stop face 69 abuts against the inner side 29 of the opening 31 of the chain link 17. The stop face 69 here abuts against a radially external section 71 of the inner side 29 of the opening 31. A region 73 of the joint pin 19 opposite the stop face 69 across the joint axis 23 can here abut against a radially internal section 75 of the inner side 29 of the opening 31, or be supported thereon.

In the region of the stop 65, in particular in the region of the stop face 69, the joint pin 19 has a diameter 77 which is on the one hand larger than a diameter of the circularity without the stop 65. On the other hand, the diameter 77 is larger than the inner diameter 79 of the opening 31, or the partial opening 57, respectively, in the radial direction R.

In order to obtain a particularly reliable rotation-blocking element 27, and to keep the wear of the joint pin 19 low, the stop face 69 is as large as possible. Therefore, it preferably extends across the complete joint pin 19 along the longitudinal axis 25 of the pin 19. The shoulder 65 can here extend along the longitudinal axis 25 on the joint pin like a bead or rib.

The stop 65 can be monolithically formed with the rest of the joint pin 19. As an alternative, it can be produced by a joined additional element 81 connected with the rest of the joint pin 19. In particular, an additional element 81 can be joined to the rest of the joint pin 19 by forging. As an alternative, an additional element 81 can be welded to the rest of the joint pin 19. Preferably, an additional element 81 is connected with the rest of the joint pin 19 by a material bond 83.

The stop face 69 preferably abuts flatly against the inner side 29 or 71, respectively, of the opening 31 when the maximum joint angle 35 is reached. In other words, it is preferably formed in parallel to the section of the inner side 71 where it abuts when the maximum joint angle 35 is reached.

The stop face 69 is preferably arranged to face away from the rest of the chain link 15 including the stop face 69. In other words, a surface normal 85 of the stop face 69 is oriented such that it faces away from the rest of the chain link 15 or, in other words, that an angle between the surface normal 85 and the longitudinal axis 37 of the chain link is greater than 90°. Consequently, the two surface normals 85 of two joint pins 19 received in a chain link 17 at least partially face each other or intersect. This means that two stop faces 69 of the joint pin 19 received in a chain link 17 are opposed to each other with respect to the opening 31 of the chain link 17.

To be able to abut against the radially external section 71 of the inner side 29 of the opening 31, the stop face 69 is preferably arranged at the radially external side 87 of the joint pin 19. Simultaneously, the stop face 60 is preferably arranged within a cross-sectional half 88 opposed to the rest of the chain link 15 across the joint axis 23.

Below, FIG. 4 will be discussed which represents a standing chain link 17 with a guide web 53 in a cross-section transverse to the circumferential direction U.

As already described above, the guide web 53 is arranged in the opening 31 of the chain link 17 such that an interruption 51 of the radially internal leg 49 is closed by the guide web 53. Here, the guide web 53 abuts against the inner side 29, in particular at the inner side 29 opposed to the interruption 51.

The guide web 53 has a shoulder 89 through which the guide web 53 extends axially further to the chain mesh 7 than the remaining part of the guide web 53 arranged in the chain link 17.

The shoulder 89 extends towards the chain mesh 7 or in parallel to the axial direction A approximately as far as a chain link 15 connected to the chain link 17. In other words, the guide web 53 and the chain link 15 are essentially flush in the axial direction at one level.

The guide web 53 is preferably structured in a dished way, wherein a wall 91 is arranged axially internally, and a cavity 93 accessible from outside is arranged axially externally. By the dish-type embodiment, weight can be saved.

The wall 91 can abut, when installed, against the fire wall 11 which is only indicated in a dashed line in FIG. 4. Through the guide web 53, in particular through its radially external end 95 arranged within the chain link 17, two legs 97 of one terminal link 99 of the chain mesh 7 extend.

The terminal link 99 can be formed as a U-shaped bow whose base or curve 101 is connected to the rest of the chain mesh 7 or a chain link thereof, respectively. In contrast, the legs project through the guide web 53, as already described.

Additionally, the legs 97 project through an axially external closing plate 103 in parallel to the axial direction A. The free ends 105 of the legs 97 can be connected to the closing plate 103, in particular by welded joints. The closing plate 103 flatly abuts against the radially external end 95 of the guide web 53 transverse to the axial direction A. The closing plate 103 can also be welded to the end 95 of the guide web 53.

The legs 97 can be radially bent to the outside in a region between the chain link 17 and the curve 101, so that an opening 107 of the chain link attached to the curve 101 is located radially further to the outside than the free ends 105 of the legs 97.

From the region of the shoulder 89 towards the radially internal end 109, the guide web 53 can become narrower in the axial direction A.

Reference Numerals 1 anti-skid chain
3 tire
5 guide chain
7 chain mesh
9 tread
11 tire wall
12 tire axis
13 tire radius
15 lying chain links
17 standing chain links
19 joint pin
21 swivel joint
23 joint axis
25 longitudinal axis of a pin
27 rotation-blocking element
29 inner side
31 opening
33 joint angle
35 maximum joint angle
37 longitudinal axis of the chain link 15
39 longitudinal axis of the chain link 17
41 self-supporting radius
43 openings of the chain links 15
45 leg of the chain link 15
47 C-shaped partial link
49 leg of the chain link 17
51 interruption
53 guide web
55 curve
57 partial opening
59 radial length
61 length in the circumferential direction
63 cross-section of the joint pin
65 stop
67 shoulder
69 stop face
71 radially external section of the inner side
73 section opposed to the stop face
75 radially inner section
77 diameter of the joint pin
79 inner diameter of the opening
81 joined additional element
83 material bond
85 surface normal
87 radially external side
88 cross-sectional half
89 shoulder
91 wall
93 cavity
95 radially external end
97 leg
99 terminal link
101 curve
103 closing plate
105 free end
107 opening
109 radially internal end of the guide web
A axial direction
radial direction
U circumferential direction

The invention claimed is:

1. Anti-skid chain for tires comprising treads, wherein the tires are configured to rotate in a circumferential direction, wherein the anti-skid chain comprises two laterally stable guide chains configured to be arranged to a side of the treads of the tires, wherein the anti-skid chain comprises a flexible chain mesh which extends between the two guide chains, and wherein each guide chain comprises a plurality of annular chain links, wherein each chain link comprises an opening and opposite ends, wherein adjacent chain links are interconnected in an articulated manner by joint pins that are configured to rotate in the circumferential direction (U), wherein the adjacent chain links comprise alternating standing and lying chain links interconnected by the joint pins, wherein the openings of the standing chain links are oriented axially, and the openings of the lying chain links are oriented radially, and wherein the lying chain links comprise the joint pins, such that a joint pin is located at each opposite end of each lying chain link, whereby that the standing chain links hold the joint pins of the lying chain links to interconnect adjacent lying chain and standing chain links, wherein each guide chain comprises at least one rotation-blocking element configured to define a maximum joint angle between two interconnected chain links, characterized in that a part of the rotation-blocking element is located on at least one of the joint pins, wherein the at least one rotation-blocking element comprises at least one stop face at the joint pin such that the at least one stop face abuts against an inner side of the opening of the standing chain link holding the at least one joint pin when the maximum joint angle is reached, wherein each standing chain link comprises at least one guide web radially extending in the direction of the tire axis for laterally guiding the anti-skid chain at the tire, and wherein at least one standing chain link comprises a C-shaped partial link comprising an interruption in the link, wherein the interruption is at least partially closed by the at least one guide web.

2. Anti-skid chain according to claim 1, characterized in that at least one joint pin has, for forming the at least one stop face, a non-circular cross-section.

3. Anti-skid chain according to claim 1, characterized in that the at least one joint pin is provided with at least one shoulder including the at least one stop face.

4. Anti-skid chain according to claim 1, characterized in that the at least one joint pin is provided with at least one joined additional element which includes the at least one stop face.

5. Anti-skid chain according to claim 4, characterized in that the at least one joined additional element is connected to the rest of the joint pin by a material bond.

6. Anti-skid chain according to claim 1, characterized in that the at least one stop face is arranged facing away from the rest of the chain link including the stop face.

7. Anti-skid chain according to claim 6, characterized in that two stop faces are opposed with respect to the opening of a standing chain link.

8. Anti-skid chain according to claims 1, characterized in that the at least one stop face is arranged at a radially external side of at least one joint pin.

9. Anti-skid chain according to claim 1, characterized in that the at least one stop face abuts, at least in sections, flatly against the inner side of the opening of the standing chain link holding the at least one joint pin when the maximum joint angle is reached.

10. Anti-skid chain according to claim 1, characterized in that a radial length of the standing chain link is larger than a length of the standing chain link in the circumferential direction.

\* \* \* \* \*